INVENTOR
ALEXANDER TURCZYN

BY Rene A. Kuypers
ATTORNEY

United States Patent Office 3,509,547

Patented Apr. 28, 1970

3,509,547

PERMANENT MAGNETIC RECORDING

Alexander Turczyn, Philadelphia, Pa., assignor to Sperry Rand Corporation, New York, N.Y., a corporation of Delaware Filed May 2, 1966, Ser. No. 546,631
Int. Cl. G11c *11/14, 7/00, 5/02*
U.S. Cl. 340—174 11 Claims

ABSTRACT OF THE DISCLOSURE

A technique is disclosed for permanently recording information by skewing the easy and hard axis of a memory element with respect to the geometric axis of the drive line.

This invention relates to the permanent recording of information. In particular, this invention relates to the permanent recording of binary information on a magnetizable thin film element.

There is a need in the present state of the computer art for digital memories which permanently stored binary information. An example of such a need occurs when a computer utilizes mathematical tables during the processing of data. Since the mathematical tables may be used for many different computer programs, it would be advantageous to have this information permanently stored in a read only type memory. In this manner, the operator need not take time to re-load the memory with the tables each time that a new program is being run.

When a plated magnetizable wire or planar thin film memory element having a uniaxial anisotropy is being utilized to record permanent "1's" and "0's" for such a read only memory, the problem of accidental destruction of information becomes particularly acute. Information may be destroyed by excessive current either in an associated drive strap or the bit current line. When this occurs, the memory plane containing the permanently stored information must be disassembled and the "1's" and "0's" rewritten by external means. It is evident that should the above occur in a read only memory great inconvenience and excessive downtime would occur in a computer. This is undesirable because of the large operating costs incidental to computer operations.

Figure 1:
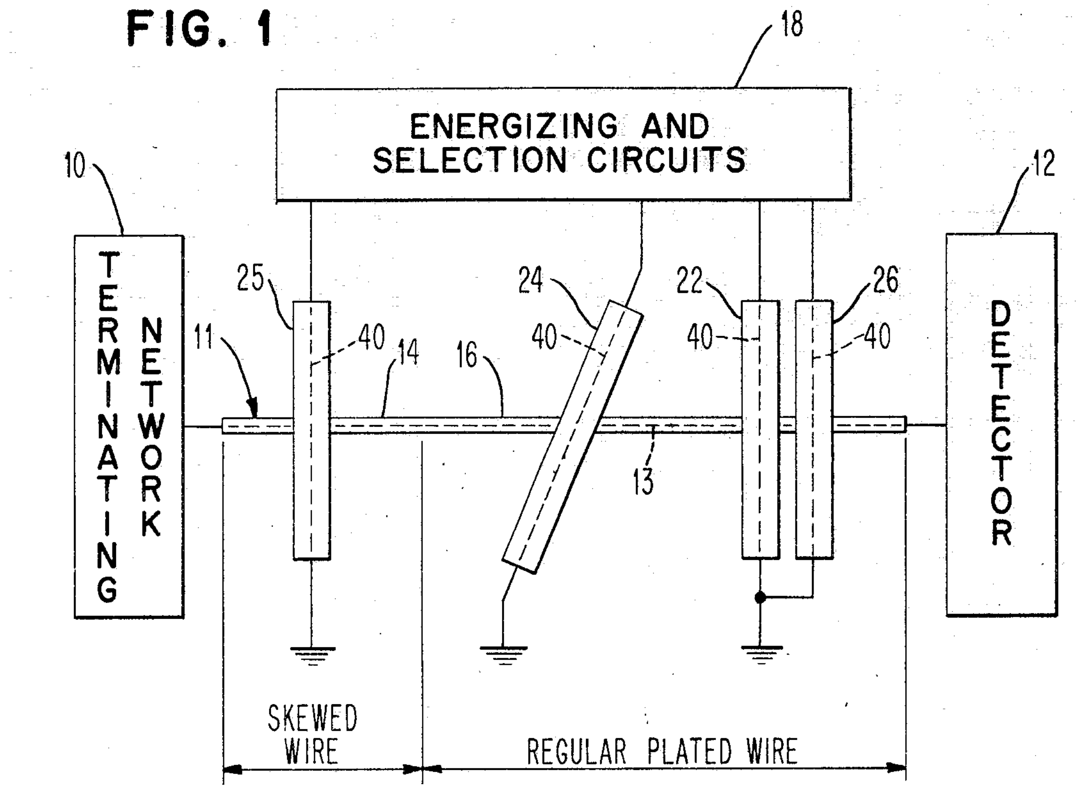
Figure 2:
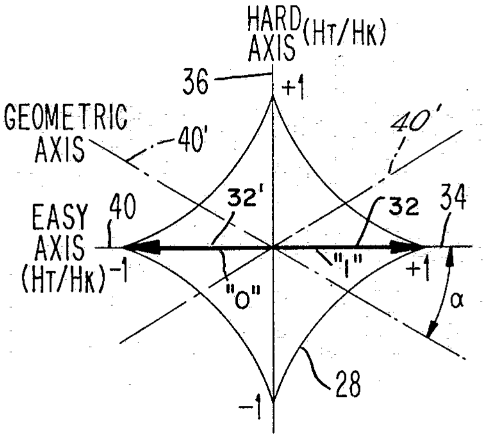
Figure 3:
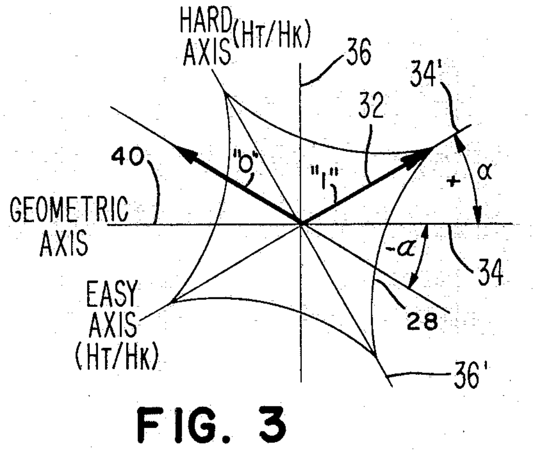

Accordingly, it is an object of this invention to provide an arrangement for providing permanent memory information. It is yet another object of this invention to provide a technique for permanently storing binary information on a thin film memory element. It is still another object of this invention to permanently record binary information on magnetizable thin film elements having the property of uniaxial anisotropy. Other objects will become more apparent as a full and complete description of the invention is made. The various features of the exemplary embodiments according to the invention, may be best understood with reference to the accompanying drawings, wherein:

FIGURE 1 depicts a plated magnetizable wire having a preferred or easy axis of magnetization wherein the easy axis is skewed with respect to the geometric axis of the drive strap. FIGURE 2 shows one embodiment of the instant invention wherein the geometric axis of the drive strap is skewed with respect to the easy axis which is circumferential to the longitudinal axis of the wire. FIGURE 3 illustrates another embodiment of the invention wherein the easy axis of a thin film memory element is made non-circumferential to the longitudinal axis of the wire and is therefore skewed with respect to the geometric axis of a drive strap.

Referring now to the drawings in greater detail, there is depicted a plated magnetizable wire 11 which is grounded at one end to the terminating network 10 (e.g. ground) and at the other end to the detector or sense amplifier 12. In another embodiment (not shown) the plated wire 11 may be grounded at both ends to a metallic ground plane. The plated wire may be arranged with respect to the ground plane in the form of a co-axial line wherein the wire is the inner conductor and the ground plane is the outer conductor and the two are separated by an insulator (e.g. polyurethane). Accordingly, the plated wire 11 becomes a low impedance device so that the plated wire may operate in the current steering mode. The plated magnetizable wire 11 is conventionally a five mil beryllium-copper substrate upon which is coated a thin magnetizable film on the order of 10,000 angstroms. The thin magnetizable film (not shown) is coated on the wire 11 in the presence of a magnetic field thereby inducing in the magnetic coating the property of uniaxial anisotropy. Accordingly, the uniaxial anisotropy includes a preferred or easy axis of magnetization (i.e., all the magnetization is aligned in one direction). A hard axis of magnetization is also thereby obtained which is 90° removed the easy axis. A binary "1" or "0" is stored along the magnetizable wire 11 by orienting the magnetization vectors or magnetic domains of the coating in a clockwise or counterclockwise orientation around the easy axis of magnetization. By way of example, a "1" may be represented by a clockwise orientation around the easy axis and a "0" by a counterclockwise orientation.

The plated wire 11 shown in FIGURE 1 is divided for ease of description into two sections wherein section 16 represents that portion of the magnetizable wire which has its easy or preferred axis of magnetization perpendicular to the longitudinal axis 13 of the wire (i.e., circumferential) and section 14 has its easy axis skewed with respect to the longitudinal axis 13 of the wire (i.e., non-circumferential).

The switching properties of an ideal thin film element having a uniaxial anisotropy can be represented by the asteroid pattern 28 of FIGURES 2 and 3. An asteroid pattern is a threshold diagram for switching a thin film memory element. The easy and hard axis of magnetization of the thin film element coincide with the two axes of the asteroid. The easy axis field $H_L$ of the film is represented on the asteroid 28 along the horizontal axis or abscissa 34. The hard axis field $H_T$ of the film is represented along the vertical or ordinate axis 36. A single magnetization vector 32 is shown as being oriented along the easy or preferred axis 34 to represent binary information (e.g. a "1"). Binary information (e.g. a "0") is also represented along the easy axis in the opposite direction but the geometric axis would be as shown in FIGURE 2 (i.e., the geometric axis lies in the first and third quadrants). In FIGURE 3, the "0" would be along the easy axis but the asteroid would be rotated in a clockwise direction.

In addition to the above mentioned $H_T$ and $H_L$ fields associated with the asteroid 28 there is an additional field called the anisotropy field $H_K$. The value of the $H_K$ field is equivalent to the minimum value of $H_T$ which is required to fully saturate the film in the transverse direction. In other words, if the value of $H_T$ is equal to the value of $H_K$ this signifies that the transverse field will drive the magnetization vector (32 in FIGURE 2) from the easy to the hard axis of magnetization (i.e., through an angle of 90°). Therefore, assuming that the hard axis field $H_T$ is applied to the magnetization vector 32 (FIGURE 2) and the ratio $H_T/H_K \geq 1$ then the vector will rotate 90° and upon removal of the $H_T$ field, the film will break up (because of the absence of any steering field) and the information will be destroyed. In other words, the 90° hard axis is an unstable position and when the magnetization vector 32 is rotated to this position by $H_T$, the vector breaks up into a plurality of magnetic domains.

Returning again to FIGURE 1, a plurality of drive straps 20, 22, 24 and 25 are shown juxtaposed to the plated wire 11. These drive straps are grounded at one end and are connected to a conventional energizing and selection circuit 18. By means of the energizing and selection circuit 18, any one of the straps may be selectively energized. Accordingly, when a strap is energized current is conducted from the circuit 18 to ground or vice versa. The current which flows through any one of the straps 20, 22, 24 and 25 generates a transverse or hard axis field $H_T$ in accordance with Ampere's Law. Since a transverse field $H_T/H_K \geq 1$ generated by means of the current flowing in the drive straps 20, 22, 24 and 25 will destroy the information such as that represented by the binary "1" magnetization vector 32 of FIGURE 2, it is the purpose of the instant invention to prevent the destruction of information irrespective of the magnitude of the $H_T$ field applied by the drive straps.

In accordance with this invention and to prevent destruction of the stored binary "1," the easy axis of magnetization 34 (FIGS. 2 and 3) is purposely skewed with respect to the geometrical axis 40 of the drive straps. Conventionally, the geometrical axis 40 of the word straps are oriented substantially perpendicular to the longitudinal axis 40 (FIG. 1) of the plated wire 11 or parallel to the easy axis. Thus in a conventional arrangement the geometrical axis 40 of straps 20 and 22 (FIG. 1) are oriented perpendicular to the longitudinal axis 40 of the plated wire 11. However, as briefly mentioned above, the geometrical axis 40 of the drive straps are purposely skewed with respect to the easy axis 34 of the magnetizable wire 11. The skewing between the geometric axis 40 of the drive line and the easy axis 34 of the magnetizable wire 11 may be accomplished in either one of two ways in accordance with this invention.

The first technique for purposely skewing the magnetic easy 34 axis and geometrical axis 40 is shown in FIGURE. 1. This is accomplished by purposely fabricating the easy axis of the section 14 of plated wire 11 so that it is non-circumferential while keeping the geometric axis 40 of strap 25 perpendicular to the longitudinal axis 13 of the wire 11. As was mentioned in the beginning, the conventional easy axis or preferred axis of magnetization is induced circumferentially in the magnetic coating by passing the plated wire 11 during the fabrication process through a magnetic field. In order to induce a non-circumferential easy axis, the magnetic field is arranged so that the lines of flux are angled to the proper skewing angle as the plated wire passes through the field. A non-circumferential easy axis can also be induced by stressing the substrate wire during the plating process by applying torsion to either end. When the torsional stress is removed the easy axis becomes skewed with respect to the longitudinal axis.

The result can be better appreciated by referring to the asteroid diagram 28 of FIGURE 3. Thus, the easy axis 34 has been skewed or made non-circumferential by translating it by an angle $+\alpha$ so that it assumes a position along easy axis 34'. However, the geometric axis 40 of the drive strap 25 remains perpendicular to the longitudinal axis 13 of plated wire 11. In other words, the geometric axis 40 of the strap 25 remains parallel to the old easy axis 34. Therefore, the drive strap 25 is skewed at an angle $+\alpha$ with respect to the non-circumferential easy axis.

In operation, the strap 25 is energized by means of the selection circuit 18 (FIG. 1) thereby causing a current to flow through the strap to ground as mentioned above. By energizing the strap 25 a magnetizing force $H_T$ is generated which causes the magnetization vector 32 to rotate toward the hard axis of magnetization 36' (FIG. 3). Since the geometric axis 40 of the drive strap 25 is oriented along the axis 34 (i.e., the circumferential easy axis before skewing) and the magnetizing force $H_T$ which is generated is in a direction along the axis 36 (i.e., the hard axis before skewing) it becomes evident that the vector 32 can only rotate as far as the axis 36. In other words, the magnetization vector 32 aligns itself with the magnetization force $H_T$ which is in a direction perpendicular to the geometric axis or along the axis 36. It will be recalled that there is a break-up of the thin film into magnetic domains only when $H_T/H_K \geq 1$. It will be recalled that there is a break-up of the ideal thin film into magnetic domains when the magnetization vector 32 is aligned along the hard axis of magnetization. In accordance with the above described arrangement vector 32 cannot be rotated to coincide with axis 36' irrespective of how much current is applied to the word strap 25 by the energizing circuit 18. Upon removal of the drive field the magnetization vector 32 relaxes to its original position. Accordingly, the binary "1" stored therein is permanent and cannot be destroyed.

The above explanation has been with respect to a binary "1." In the event that a binary "0" is to be permanently stored at a location, the easy axis 34 is skewed to the angle $-\alpha$. In other words, the asteroid (not shown) is rotated in a clockwise direction and assumes the easy axis the same angle in the first and third quadrant as in the second and fourth quadrant. By this orientation, the $H_T$ field cannot rotate the "0" vector (not shown) as far as the hard axis and hence, it cannot be destroyed irrespective of its magnitude.

The instant invention provides another arrangement to obtain the deliberate skewing between the easy axis of a magnetic thin film element and the geometric axis of the drive strap. Thus, by referring to FIGURE 1 it can be readily seen that the strap 24 is deliberately skewed with respect to the section 16 of the plated wire 11. The section 16 is a conventional plated wire in that the induced easy axis is circumferential. This physical arrangement of FIGURE 1 may be demonstrated graphically by referring to the asteroid diagram of FIGURE 2.

Thus, in order to skew the geometric axis 40 of the drive strap 24 with respect to the easy axis 34, the latter is induced circumferentially, whereas the geometric axis 40 of the strap 24 is rotated through and angle $-\alpha$. By rotating the geometric axis 40 of strap 24 the geometric axis assumes the position along the new geometric axis 40' (i.e., the axis lies in the second and fourth quadrants).

The mode of operation in this embodiment is similar to that previously described. Thus, the magnetizing force generated by the current in the strap 24 causes the magnetization vector 32 to rotate towards the hard axis of magnetization 36. However, no matter how great a transverse field $H_T$ is applied to the drive strap 24, the magnetization vector 32 cannot rotate to the unstable hard axis 36. In other words, the magnetization vector 32 can only rotate to a maximum position which is perpendicular to the geometric axis 40' of strap 24. In order to store a permanent "0" bit of information, the geometric axis 40' is skewed at an angle $+\alpha$ (i.e., the axis lies in the first and third quadrants). In all other respects, the operation is the same as that which was previously described. Accordingly, the information represented by the magnetization vector 32 cannot break up into a plurality of magnetic domains and the binary information cannot be destroyed.

Figure 4:
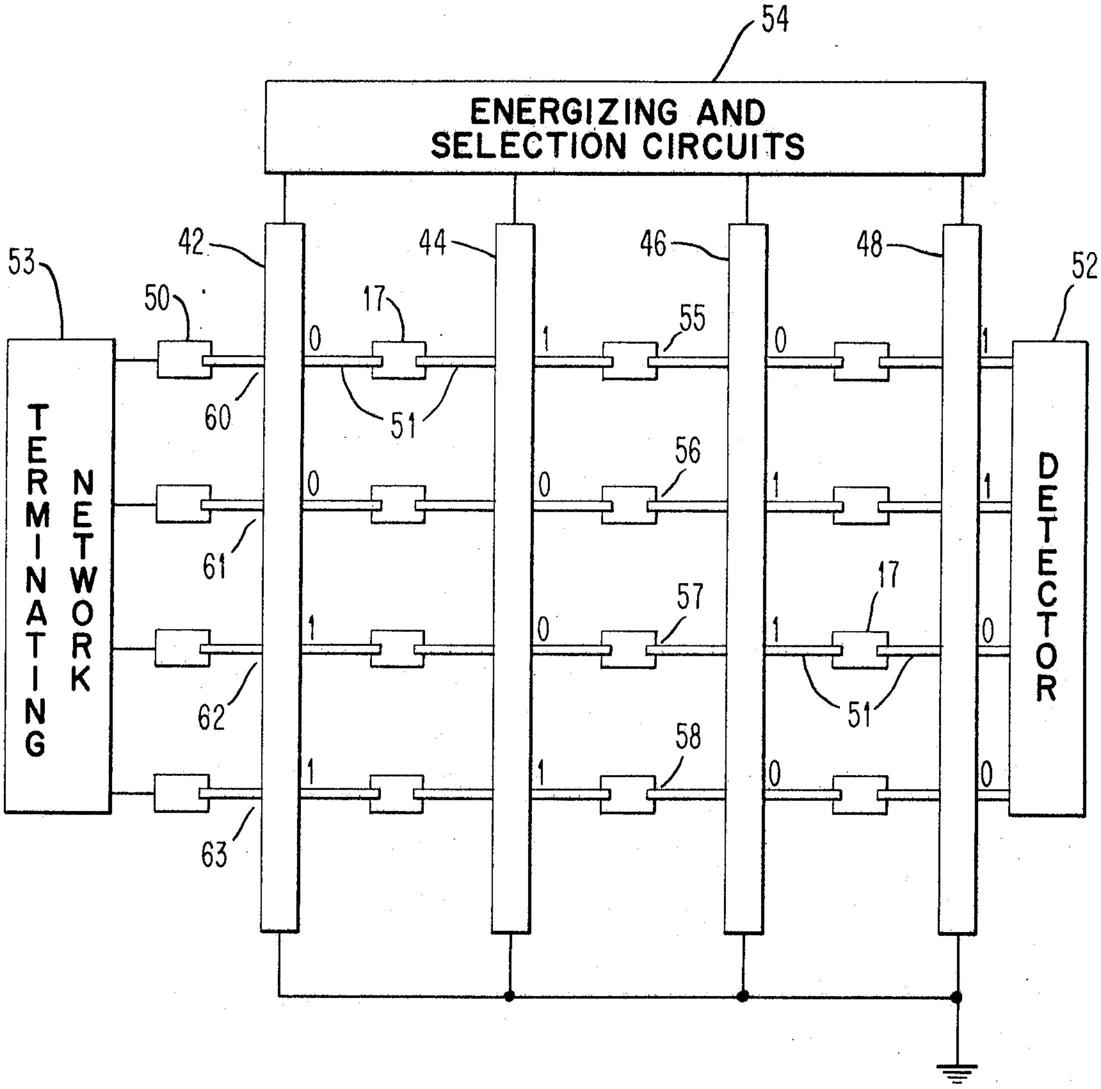

Referring now to FIGURE 4 there is depicted a read only memory arrangement which utilizes the permanent memory locations of the instant invention. It will be recalled that the read only type memory may be utilized in computer systems whenever it is required to store permanent information such as mathematical tables. Accordingly, the information which is stored at the various memory locations of a read only memory is permanently magnetized with the desired binary coded information. Consequently, no write circuitry is included for a read only memory system.

FIGURE 4 shows a 16 bit read only memory plane. The memory plane utilizes 16 short plated wire sections 51. The plated wire sections 51 have the same physical characteristics as that previously described. In the subject embodiment, four plated wire sections 51 are connected in series by utilizing copper soldering pads 50. Connected to one end of the series connected plated wires 51 is the detector circuit 52. At the other end of the series connected circuit is the terminating network 53 which may simply comprise a grounding bus. The operation of this circuit arrangement will be explained in greater detail hereinafter.

Positioned substantially orthagonal to the plated wire sections 51 are the word straps 42, 44, 46 and 48. One end of the conductors straps 42, 44, 46 and 48 are connected to the energizing and selection circuit 54. The other end of the conductor strap is connected to ground. The words solenoids are typically 20 mils wide and are juxtaposed to the plated wire sections 51. The orientation of the read only memory shown in FIGURE 4 is similar to that of the conventional word organized random access memory using plated wires. In other words, the memory words are oriented along the conductors 42, 44, 46 and 48. In the conventional word organized random access memory, however, the plated wire is a continuous one whereas the read only memory of the instant invention wire is made up of a number of short sections which are connected in series as shown. In the read only memory of FIGURE 4, each of the words oriented along the straps 42, 44, 46 and 48 have a four bit capacity. Thus, the bits "0," "0," "1," "1" are stored respectively at the bit locations 60, 61, 62 and 63. Various other combinations of binary information are stored along the word strap 42, 44, 46 and 48 for illustrative purposes. It should be understood, however, that the four bit capacity is exemplary only and the memory may have a plurality of such bits.

A permanent binary "1" or "0" is obtained in accordance with this invention at the various bit locations (location 60, for example) by skewing the easy axis of the wire with respect to the geometric axis of the word strap. As was previously discussed, this may be accomplished in one of two ways, namely, by orienting the geometric axis 40 (FIG. 1) of the word strap at an angle $+\alpha$ or $-2$ with respect to the longitudinal axis 13 of the plated wire while keeping the easy axis circumferential and secondly, by skewing the easy axis at an angle $+\alpha$ or $-2$ (i.e., by making the easy axis non-circumferential) while keeping the geometric axis 40 of the drive line perpendicular to the longitudinal axis 13 of the plated wire. The latter arrangement will be utilized for descriptive purposes in the read only memory arangement of FIGURE 4.

The read out of the permanently stored information is accomplished by energizing the required word line by means of the energizing and selection circuits 54. Thus, in the event that a computer system requires that the information stored along strap 44 be read into a computer register, a current is caused to flow therein to ground. It should be noted that the read out of the information (1001) along the solenoid 44 in accordance with the invention is non-destructive regardless of the level of the current supplied by the energizing and selection circuit 54. The current in strap 44 generates a magnetizing force $H_T$. The magnetizing force $H_T$ causes the magnetization vectors at each bit location to be rotated toward the hard axis and causes a voltage to be induced in each of the lines 55, 56, 57 and 58. The polarity of the voltage (positive or negative) induced in each of the lines distinguishes whether a "1" or a "0" is recorded at the respective bit locations. The respective voltages induced in the lines 55, 56, and 57 and 58 are detected by the detector circuit 52. In actual practice, the detector 52 may comprise a plurality of flip-flop registers which become set or reset and therefore determine whether a "1" or "0" has been read out of the memory. The grounding bus of the terminating network 53 provides a complete circuit to the detector 52 which is also grounded.

As was previously discussed, information stored at the various bit locations cannot be destroyed since the easy or preferred axis of magnetization is skewed with respect to the geometric axis of the word strap. Consequently, the word line current in the conductors 42, 44, 46 and 48 supplied by the energizing and selection circuit 54 is not limited in value. For this reason, higher output voltages and very fast read out of the information can be achieved by actually utilizing a higher than normal drive current. The reason that higher output voltages can be obtained with the instant invention is that the voltage induced in a plated wire section 51 is equal to $d\phi/dt$ where $\phi$ represents the flux. However, the rate change of flux or $d\phi/dt$ is proportional to the amount of current that flows in the strap conductor. Thus, the higher the current the greater the rate of change of flux. Therefore, the advantage of the read only memory obtained by this invention is that higher than normal currents can be utilized to obtain higher output voltages. This factor is significant in that less critical circuitry may be utilized with the memory. Further, since higher currents can be utilized in the drive strap faster switching of the flux (i.e., $d\phi/dt$ increases) so that the read out of information is very rapid. This is very desirable in modern day memories since computers are required to operate very rapidly.

In summary, this invention relates to the permanent recording of binary information in a thin film memory element having the property of uniaxial anisotropy. Permanent recording of information is obtained by skewing the geometric axis of the juxtaposed drive strap with respect to the preferred or easy axis of the thin film memory element. This may be accomplished in one of several ways. In one mode of operation, the easy axis in the case of a plated wire is made circumferential and the geometric axis of an associated drive strap is purposely skewed to the longitudinal axis of the wire. In the other way, the easy axis is made non-circumferential and the geometric axis of the drive strap is oriented perpendicular to the longitudinal axis of the wire.

The embodiments of the invention in which an exclusive property or privilege is claimed are defined as follows:

1. The combination comprising:
(a) a data storage means having a ferromagnetic coating which has an easy and a hard axis of magnetization removed 90 degrees from said easy axis, the magnetization vectors of said coating being normally oriented along said easy axis,
(b) a flux generating means, which has a geometric physical axis, coupled to said data storage element,
(c) said easy axis and said geometric axis being deliberately skewed with respect to one another,
the angles generated by said hard axis and said geometric axis being equal to one another and greater than 90 degrees when storing a first or in the alternative, a second information signal,
(d) the deliberate skewing of said easy axis and said longitudinal axis being such that the energizing of said flux generating means provides a magnetic force which rotates said magnetization vectors through an angle which can never reach said hard axis irrespective of the magnitude of said force.

2. The combination in accordance with claim 1 wherein said data storage means comprises a plated wire.

3. The combination in accordance with claim 2 wherein said easy axis is non-circumferential so that said easy axis is skewed at a first angle to store a first information signal and is skewed at a second angle to store a second information signal, said physical axis of said flux generator being oriented substantially perpendicular to the physical wire axis,
said first and second angles being equal to one another in adjacent quadrants.

4. The combination in accordance with claim 1 wherein said data storage means comprises a thin film element having the property of uniaxial anisotropy.

5. The combination in accordance with claim 4 wherein said easy axis of said thin film element is skewed at a first angle to store a first information signal and in the alternative, said easy axis being skewed at a second angle to store a second information signal with respect to the normally oriented physical axis of said flux generating means, said first and second angles being equal to one another in adjacent quadrants.

6. The combination in accordance with claim 4 wherein said easy axis of said thin film element is conventionally oriented and the physical axis of its associated drive strap is oriented at a first angle with respect to said easy axis to store a first information signal and at a second angle with respect to said easy axis to store a second information signal, said first and second angles being equal with respect to adjacent quadrants.

7. A read only memory comprising:

(a) a plurality of magnetic storage elements having an easy axis of magnetization, said plurality of storage bits representing a plurality of multi-bit data words, (b) a plurality of word lines, each respective word line magnetically linking all of the storage elements comprising one of said data words, (c) the longitudinal physical axis of each said word line being skewed with respect to the easy axes of the data word storage elements, said word axes and said hard axes being oriented at a first angle to store a first signal and said word axes and said hard axes being oriented at a second angle to store a second signal, said first and second angles being equal to one another and greater than 90 degrees, (d) means linking the respective storage elements of each said plurality of data words, (e) detector means connected to said linking means, (f) a selective energizing means connected to said plurality of word lines.

8. A read only memory in accordance with claim 7 wherein said magnetic storage elements comprise locations along a magnetizable wire having the property of uniaxial anisotropy.

9. A read only memory in accordance with claim 7 wherein said easy axis is skewed with respect to said longitudinal physical axis of said word line by said easy axis being circumferential and said physical axis being skewed thereto.

10. The read only memory in accordance with claim 7 wherein said physical axis is arranged orthogonal to said means linking the respective storage elements and said easy axis is deliberately skewed with respect to the physical axis.

11. The method of reading information in a memory device comprising the steps of (a) orienting the hard axis of said memory device with respect to a drive line so that the angle made by said hard axis and the geometric axis of said drive line is greater than 90 degrees irrespective of whether a binary "one" or "zero" is stored thereat, (b) energizing said drive line such that the magnetization of said film never reaches the hard axis.

References Cited

UNITED STATES PATENTS

| | | | |
|---|---|---|---|
| 3,111,652 | 2/1959 | Ford | 340—174 |
| 3,217,301 | 6/1962 | Shook | 340—174 |
| 3,278,914 | 10/1966 | Rashleigh et al. | 340—174 |

BERNARD KONICK, Primary Examiner

S. B. POKOTILOW, Assistant Examiner